United States Patent
King et al.

(10) Patent No.: US 7,409,703 B2
(45) Date of Patent: Aug. 5, 2008

(54) METHOD AND SYSTEM FOR EFFICIENT STORAGE OF DATA IN A SET TOP BOX

(75) Inventors: Lou King, Ijamsville, MD (US); Michael Ficco, Silver Spring, MD (US); John May, Ijamsville, MD (US); Jorge Guzman, Damascus, MD (US); Yong Gao, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1163 days.

(21) Appl. No.: 09/978,469

(22) Filed: Oct. 17, 2001

(65) Prior Publication Data

US 2002/0147992 A1    Oct. 10, 2002

Related U.S. Application Data

(60) Provisional application No. 60/281,614, filed on Apr. 5, 2001.

(51) Int. Cl.
*H04L 12/28* (2006.01)
(52) U.S. Cl. ............... 725/151; 725/153; 711/203; 711/202; 711/100
(58) Field of Classification Search ............... None
See application file for complete search history.

(56) References Cited

U.S. PATENT DOCUMENTS

| | | | |
|---|---|---|---|
| 6,208,273 B1 * | 3/2001 | Dye et al. | 341/51 |
| 6,594,728 B1 * | 7/2003 | Yeager | 711/127 |
| 6,692,358 B2 * | 2/2004 | Lawrence et al. | 463/39 |
| 6,711,683 B1 * | 3/2004 | Laczko et al. | 713/189 |
| 6,760,815 B1 * | 7/2004 | Traversat et al. | 711/135 |
| 7,050,061 B1 * | 5/2006 | Baldwin | 345/552 |
| 2001/0013126 A1 * | 8/2001 | Lemmons et al. | 725/53 |
| 2001/0048804 A1 * | 12/2001 | Yoo et al. | 386/69 |
| 2005/0216772 A1 * | 9/2005 | Noble | 713/201 |

OTHER PUBLICATIONS

MEDIC: a memory and disk cache for multimedia client, Edward Chang and Hector Garcia-Melina, Jul. 1999, Multimedia Computing and Systems 1999, pp. 493-499.*

* cited by examiner

*Primary Examiner*—B. James Peikari

(57) ABSTRACT

A method, system and computer program product for efficient storage of data for use by an application, including a set top box. The set top box including a physical memory, a bulk storage device, and a memory management unit (MMU) coupled between the application and the physical memory and the bulk storage device. The physical memory and the bulk storage device are configured to store the data. The MMU is configured to translate a virtual address provided by the application to a physical address used by one of the physical memory and the bulk storage device.

30 Claims, 5 Drawing Sheets

US 7,409,703 B2

METHOD AND SYSTEM FOR EFFICIENT STORAGE OF DATA IN A SET TOP BOX

CROSS REFERENCE TO RELATED CASES

The present invention claims the benefit of priority under 35 U.S.C. §119(e) to U.S. Provisional Patent Application No. 60/281,614 of King, entitled "EFFICIENT DISK BASED STORAGE OF ADVANCED PROGRAM GUIDE DATA," filed on Apr. 5, 2001, the entire contents of which is incorporated by reference herein.

BACKGROUND OF THE INVENTION

1. Field of the Invention

The present invention generally relates to communications systems that transmit data for a plurality of different applications and more particularly to a method, system and computer program product for efficient storage of such data.

2. Discussion of the Background

In recent years, communications systems, such as satellite communications systems, cable communications systems, digital video broadcasting (DVB) communications systems, terrestrial broadcast communications systems, etc., have been developed. Such systems typically transmit programming information for use by devices, such as televisions, personal computers (PCs), etc., coupled to set top boxes (STBs) of such systems. The programming information may include program guide data, such as used by a program guide displayed on the television or the PC. The program guide is displayed, for example, in a matrix with times across the top in ½ hour increments, with channels along the left edge and with programs identified at the cross sections of the times and the channels. The program guide may also carry other useful information, such actors, ratings, description of programs, cost for pay per view, satellite frequency, video channel within frequency, audio channel(s) within frequency, etc. Such program guide data is typically stored in the STB for later retrieval and use by the program guide.

Such systems, however, typically employ random access memory (RAM) based storage or hard disk based storage of such program guide data, which leads to various system inefficiencies. Therefore, there is a need for a method, system and computer program product for efficient storage of such program guide data.

SUMMARY OF THE INVENTION

The above and other needs are addressed by the present invention, which provides an improved method, system and computer program product for efficient storage of data for use by an application.

Accordingly, in one aspect of the present invention there is provided an improved method, system and computer program product for efficient storage of data for use by an application, including a set top box. The set top box including a physical memory, a bulk storage device, and a memory management unit (MMU) coupled between the application and the physical memory and the bulk storage device. The physical memory and the bulk storage device are configured to store the data. The MMU is configured to translate a virtual address provided by the application to a physical address used by one of the physical memory and the bulk storage device.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A system, method and computer program product for efficient storage of program guide data, are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
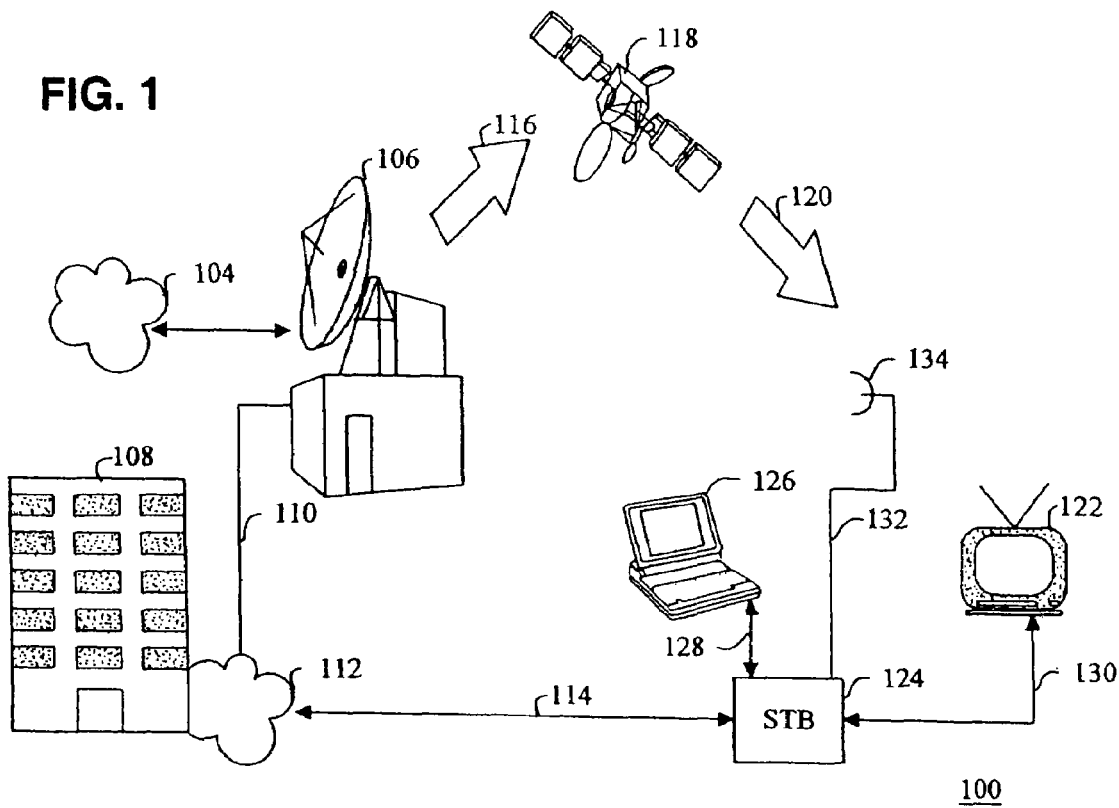
FIG. 1 is a system diagram illustrating an exemplary system for efficient storage of program guide data, according to the present invention.

Referring now to the drawings, wherein like reference numerals designate identical or corresponding parts throughout the several views, and more particularly to FIG. 1 thereof, there is illustrated a system 100 for efficient storage of program guide data, according to the present invention. In FIG. 1, in the system 100 according to the present invention, a network operations control center 106 transmits programming information 116, such as received from a network 104 (e.g., the Internet, an Intranet, program content sources, etc.), to a satellite 118. The satellite 118 then transmits programming information 120 to a dish antenna 134 coupled to set-top box (STB) 124 via signal lines 132. A device, such as a television 122, etc., may be coupled to the set-top box 124 via signal lines 130. The STB 124 may also be coupled to a data device 126, such as a personal computer, personal digital assistant (PDA), etc., via signal lines 128.

The data device 126 and the television 122 thus are able to receive the programming information and make requests for programs via the STB 124. The STB 124 transmits billing and ordering information and sends program requests as information on signal lines 114 via, for example, a telephone company 108 and a public switched telephone network (PSTN) 112, etc. The telephone company 108 then forwards the information from signal lines 114 to network operations control center 106 on signal lines 110 via the PSTN 112. With the above-noted system 100, video, audio, pay per view, video-on-demand, audio-on-demand, Internet surfing, etc., are possible.

Figure 2:
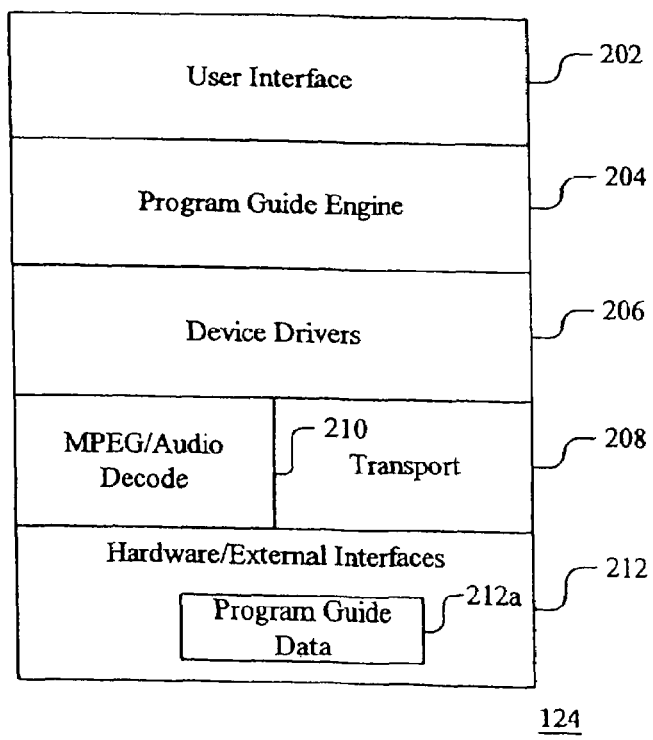
FIG. 2 is a block diagram illustrating a set top box used in the system of FIG. 1, according to the present invention.
Figure 3A:
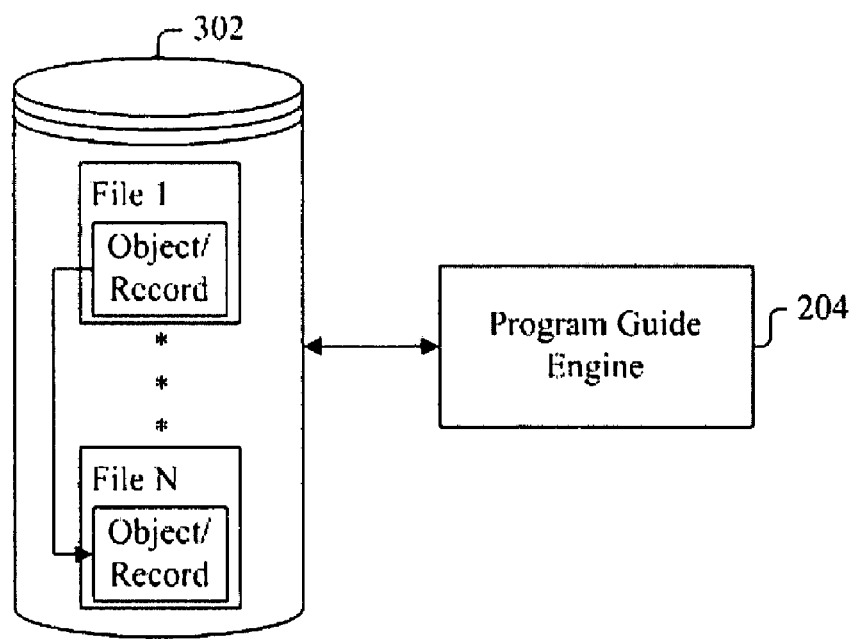
FIGS. 3a-3c are block diagrams for illustrating disk based, RAM based and virtual memory based storage of program guide data, according to the present invention.
Figure 3B:
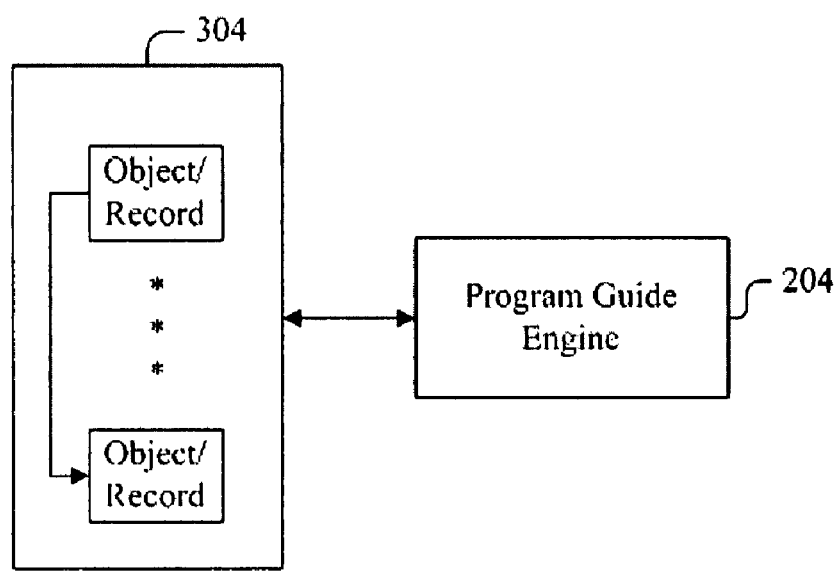
Figure 3C:
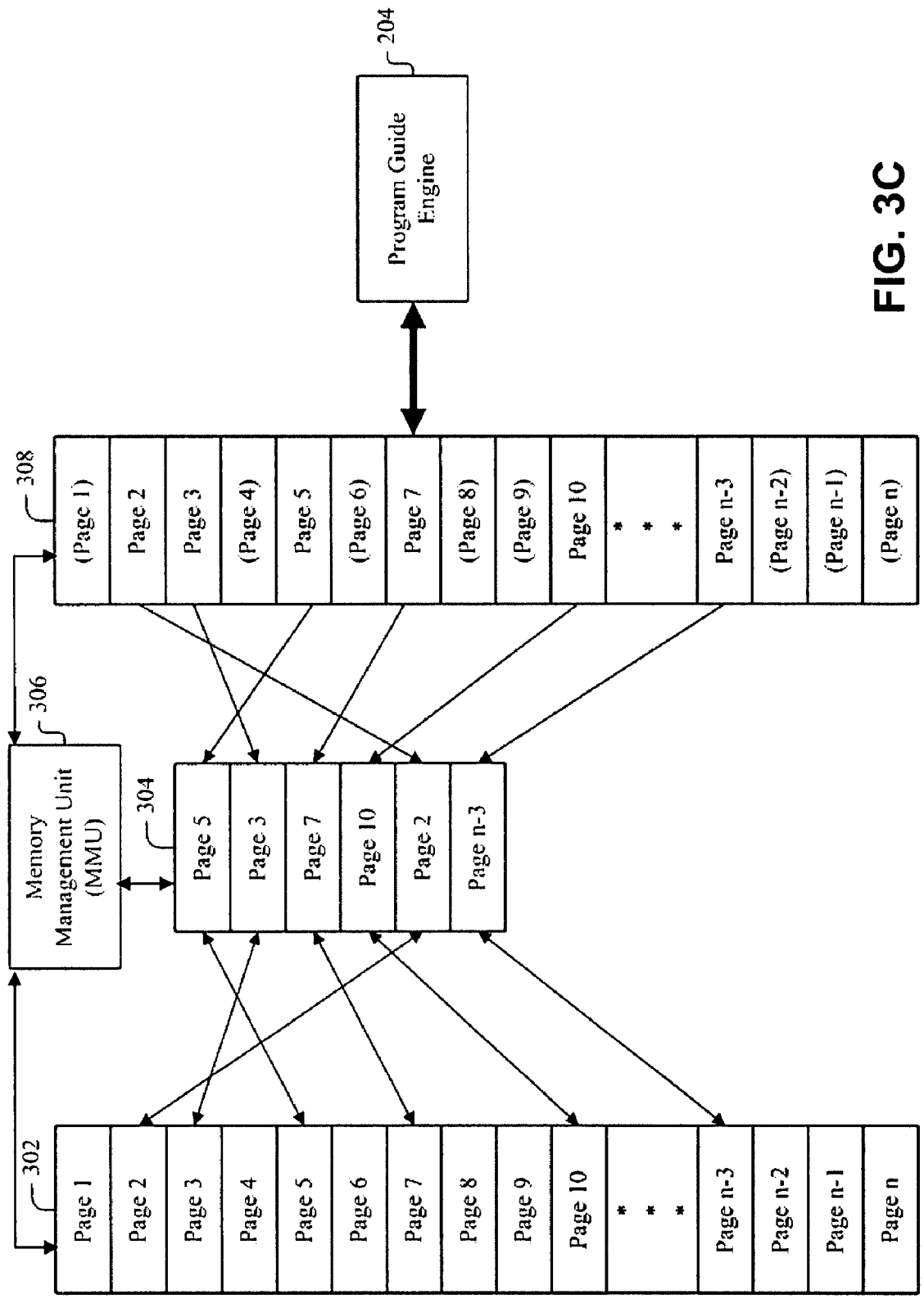
Figure 4:
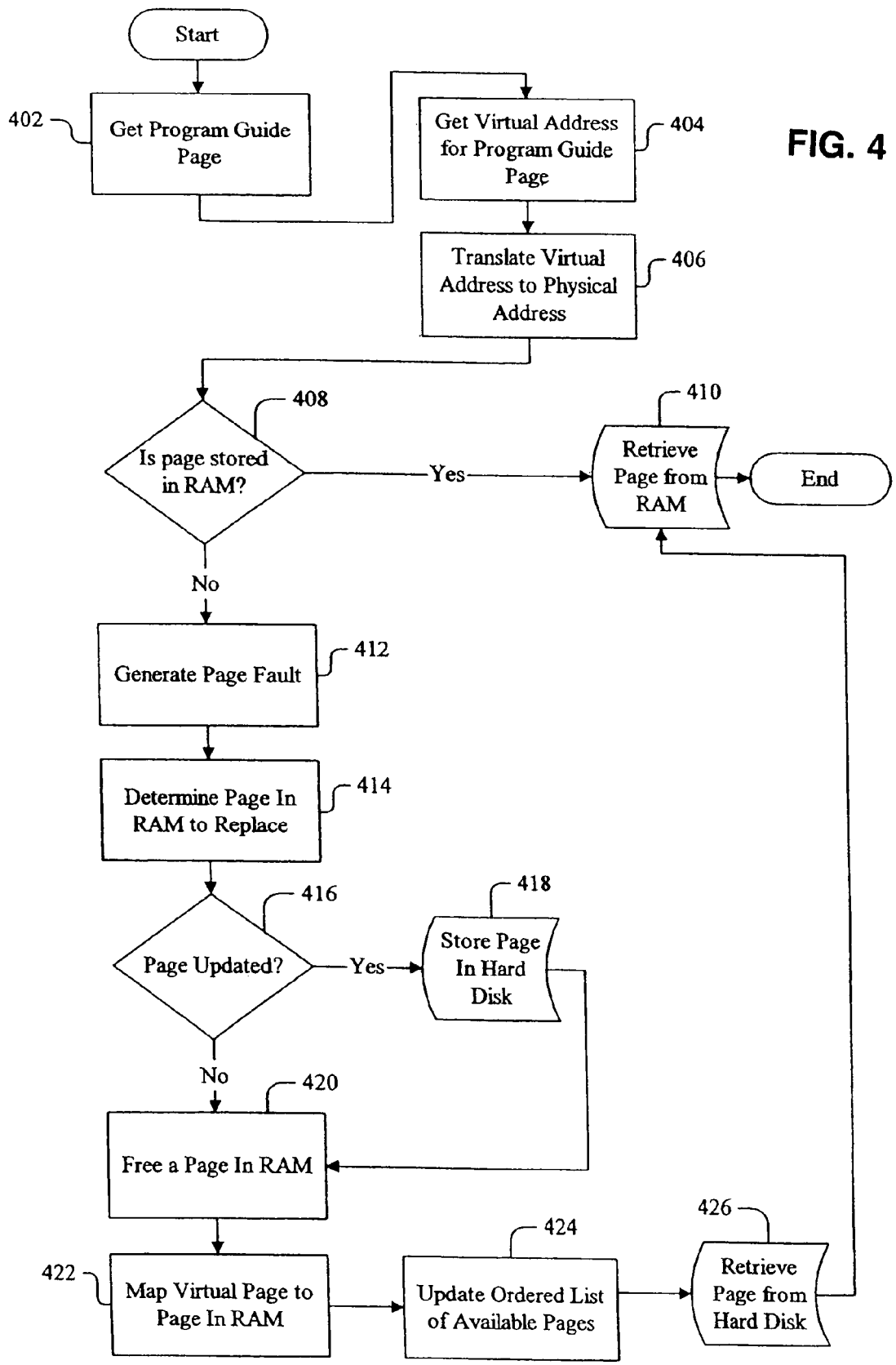
FIG. 4 is top-level flow chart for illustrating efficient storage of program guide data, according to the present invention.

Program guide data is a type of programming information 116 transmitted by the satellite 118 for use by the STBs 124 and typically is comprised of "objects" that have relationships to each other, but are separable and is further described with respect to FIGS. 2-4.

One or more interface mechanisms may be used in the system 100, for example, including Internet access, telecommunications in any form (e.g., voice, modem, etc.), wireless communications media, etc., via communication networks 104 and 112. The system 100 information also may be transmitted via direct mail, hard copy, telephony, etc., when appropriate.

Accordingly, the systems 106, 108, 118, 124, 126 and 122 may include any suitable servers, workstations, personal computers (PCs), personal digital assistants (PDAs), Internet appliances, set top boxes, other devices, etc., capable of performing the processes of the present invention. The systems 106, 108, 118, 124, 126 and 122 may communicate with each other using any suitable protocol and, for example, via the communications networks 104 and 112 and may be implemented using the computer system 501 of FIG. 5, for example.

It is to be understood that the system in FIG. 1 is for exemplary purposes only, as many variations of the specific hardware used to implement the present invention are possible, as will be appreciated by those skilled in the relevant art(s). For example, the functionality of the one or more of the systems 106, 108, 118, 124, 126 and 122 may be implemented via one or more programmed computers or devices. To implement such variations as well as other variations, a single computer (e.g., the computer system 501 of FIG. 5) may be programmed to perform the special purpose functions of, for example, the systems 106 and 108 shown in FIG. 1. On the other hand, two or more programmed computers or devices, for example as in shown FIG. 5, may be substituted for any one of the systems 106, 108, 118, 124, 126 and 122. Principles and advantages of distributed processing, such as redundancy, replication, etc., may also be implemented as desired to increase the robustness and performance of the system 100, for example.

The communications networks 104 and 112 may be implemented via one or more communications networks (e.g., the Internet, an Intranet, a wireless communications network, a satellite communications network, a cellular communications network, a hybrid network, etc.), as will be appreciated by those skilled in the relevant art(s). In a preferred embodiment of the present invention, the communications networks 104 and 112 and the systems 106, 108, 118, 122, 124 and 126 preferably use electrical, electromagnetic, optical signals, etc., that carry digital data streams, as are further described with respect to FIG. 5.

FIG. 2 is a block diagram illustrating the set top box (STB) 124 used in the system 100 of FIG. 1, according to the present invention. In FIG. 2, the STB 124 includes a user interface 202, a program guide engine 204, device drivers 206, video (e.g., MPEG, etc.) and audio decoders 210, transport logic 208 and hardware/external interfaces 212. Program guide data 212a may be stored in bulk storage (e.g., a hard disk, magneto-optical driver, etc.) and/or physical memory (e.g., RAM, etc.) included in the hardware/external interfaces 212 by the program guide engine 204 for use by the user interface 202. The hardware/external interfaces 212 are, for example, responsible for: (i) receiving the satellite signal 120 from the dish antenna 134 via the signal lines 132, (ii) outputting video and audio to the TV set 122 or the data device 126 (and/or, e.g., audio to a stereo receiver, (iii) connecting to a phone line 114 for billing, etc., (iv) receiving input from a remote control, (v) controlling a VCR, and (vi) providing other finctions, such as bulk storage, physical memory, etc.

The user interface 202 includes a lot of screens, for setup, preferences, etc., but the main screen the users deal with is a program guide based on the program guide data 212a. The program guide may be displayed, for example, in a matrix with times across the top in ½ hour increments, with channels along the left edge and with programs identified at the cross sections of the times and the channels. The program guide may also carry other useful information, such actors, ratings, description of programs, cost for pay per view, satellite 118 frequency, video channel within frequency, audio channel(s) within frequency, etc. The program guide data 212a is typically stored in the STB 124 by the program guide engine 204 for later retrieval and use by the program guide via the user interface 202.

As previously discussed, the program guide data 212a is received from the satellite 118. Also coming from the satellite 118 is video and audio that are associated together as programs. From the user interface 202, the user can choose to watch a channel, which causes the STB 124 to pick the correct satellite 118 frequency and filter the correct video and audio channels. The transport logic 208 is used to pull in the digital video and audio data and transfer it to the video (e.g., MPEG, etc.) and audio decoders 210. For example, MPEG is a standard that may be used for compressing analog video into digital video information and the decoder 210 recreates an analog video signal from the digital video information to send to the TV set 122 and/or the data device 126.

Generally, the program guide data 212a is received from the transport logic 208, passed through the device drivers 206 and stored by the program guide engine 204 for later retrieval. During this activity, the processes of this invention, as will be later described with respect to FIG. 4, are invoked. If a virtual page of the program guide that the program guide data 212a is intended to reside in happens to be in memory (e.g., RAM, etc.), the data is written to that page and an appropriate algorithm for page management is invoked to keep track of the order pages in memory that may be reused. Later, as a user accesses the program guide through the user interface 202, virtual pages are accessed by the user Interface 202 software, which contains the program guide data 212a that the user wishes to see. If the virtual page the data is intended to reside in happens to be in memory, the data is written to that page, and the appropriate algorithm for page management is invoked to keep track of the order pages in memory that may be reused. There are various flavors of the STBs 124 including "high end" STBs 124 and "low end" STBs 124 that are less expensive than the high end STBs 124 and provide basic programming services. The present invention improves the performance and lowers the cost of both types of STBs 124 that include a bulk storage medium (e.g., a hard disk, magneto-optical drive, etc.) by providing efficient storage of program guide data 212a used by the program guide engine 204.

FIGS. 3a-3c are block diagrams for illustrating disk based, RAM based and virtual memory based storage of program guide data 212a, according to the present invention. In FIG. 3a, storage of program guide data 212a (e.g., using file 1, File 2, . . . , File N including objects/records therein) typically is accomplished by storage of such information on a bulk storage medium 302 (e.g., a hard disk, magneto-optical drive, etc.) included in the hardware 212 of the STB 124 (e.g., as taught in the commonly owned U.S. Pat. No. 6,075,526 to Rothmuller, modified to include a bulk storage medium for the program guide data 212a storage, incorporated by reference herein), for example, using a file based relational database system. The STB 124 equipped with the bulk storage medium, such as hard disk 302, etc., may store a predetermined amount of program guide data 212a (e.g., 14 days worth of program guide data 212a, etc.).

In FIG. 3b, RAM based storage of program guide data 212a (e.g., using objects/records) typically is accomplished by storage of such information on a RAM 304 of the hardware 212 of the STB 124 (e.g., as taught in the commonly owned U.S. Pat. No. 6,075,526 to Rothmuller, incorporated by reference herein), for example, using a linked structure, similar to the file based relational database system of FIG. 3a, but using memory pointers to link the structures together. The STB 124 equipped with the RAM 304 may store a predetermined amount of program guide data 212a (e.g., 3 days worth of program guide data 212a, etc.).

The present invention includes recognition of problems associated with the hard disk 302 based and RAM 304 based storage of program guide data 212a shown in FIGS. 3a and 3b. In this respect, although the hard disk 302 based implementation for the storage of the program guide data 212a allows storage of larger amounts of program guide data 212a (e.g., 14 days of program guide data 212a as compared to 3 days with the RAM 304 based approach), such implementation is file system based. Using a file system typically results in numerous hard disk 302 accesses to store and retrieve the program guide data 212a due to the finding the file on the hard disk 302 and then the finding of the program guide data 212awithin the file, before the actual program 204 data may be accessed.

Similarly, although the RAM 304 based storage of program guide data 212a is faster than the hard disk 302 based approach, with this approach a smaller amount of the program guide data 212a may be stored and retrieved due to memory constraints of the RAM 304 (e.g., 3 days of program guide data 212a as compared to 14 days with the hard disk 303 based approach). In addition, the STBs 124 typically are built with a "real-time" operating system, such as vxWorks, pSOS, etc. However, such operating systems typically do not include full support for virtual memory. For example, vxWorks supports virtual addresses, but not paging of memory to and from a hard disk drive. Nonetheless, the present invention is applicable to operating systems that do and do not include fall support for virtual memory, as will be appreciated by those skilled in the computer art.

Accordingly, in FIG. 3c, the virtual memory based storage of program guide data 212a, according to the present invention, includes a memory management unit (MMU) 306 (e.g., implemented using hardware and/or software included in the STB 124, etc.) used to translate "virtual addresses" of virtual memory 308 provided by the program guide engine 204 to physical addresses used by the RAM 304 and the hard disk 302, with "paging" of memory to and from the hard disk 302. Such an implementation allows the program guide engine 204 to treat memory as larger than it is physically (i.e., comprising the memory in the RAM 304 and that allocated in the hard disk 302). In FIG. 3c, pages of the program guide data 212a in virtual memory 308 that reside only in the hard disk 302 are shown in parentheses, while pages of the program guide data 212a in virtual memory 308 that reside in the RAM 304 are shown without parentheses. The MMU 306 maintains an ordered list of which pages of the program guide data 212a in virtual memory 308 reside in the RAM 304 and the hard disk 302.

The present invention uses virtual memory 308 to allow the high speed RAM 304 based approach to storage of the program guide data 212a to be expanded (e.g., from 3 days to 14 days worth of the program guide data 212a), by, for example, using an appropriate algorithm (e.g., based on paging least-recently-used pages to the hard disk 302, using FIFO, using LIFO, using best fit in RAM 304, etc.). In this respect, use of the virtual memory 308 based approach, in many cases, eliminates the need to do any hard disk 302 accesses, as the data to be stored or retrieved is in the RAM 304 a large percentage of the time. This percentage depends on the size of physical memory (i.e., the RAM 304) devoted to storage of the program guide data 212a and can therefore be tuned to achieve optimum system performance.

In the above respect, the present invention includes tuning of parameters associated with the file system behavior. In this respect, it is advantageous to go directly to the program guide data 212a rather than through some file structure to find the program guide data 212a. The tuning according to the present invention is more direct in that the number of the hard disk 302 accesses is directly controlled by the amount of physical memory (i.e., the RAM 304) devoted to the data structure being stored. Tuning of the file system behavior is more complex, as there are more structures involved. Accordingly, more physical memory (i.e., the RAM 304) typically is desirable to achieve the tuning of the file system behavior.

FIG. 4 is top-level flow chart for illustrating the storage of the program guide data 212a in the RAM 304 and/or the hard disk 302, according to the present invention. The algorithm of FIG. 4 may be used both when the program guide data 212a is received from the transport logic 208 and/or when the program guide data 212a is accessed by the user interface 202.

In FIG. 4, at step 402, a virtual memory 308 page is accessed. At step 404 the program guide engine 204 gets a virtual address corresponding to the virtual memory 308 page accessed. At step 406, the MMU 306 translates the virtual address to a corresponding physical address. At step 408, if it is determined that the physical address of the accessed page is mapped by the MMU 306 to a physical page in the RAM 304, the data is retrieved from the RAM 304 at step 410, completing the process. Otherwise, if there is no physical page in the RAM 304 for the virtual memory 308 page accessed, a "page fault" is generated at step 412.

At step 414, a page fault handler (e.g., implemented via hardware and/or software included in the STB 124, etc.) determines which physical page in the RAM 304 to replace, using an appropriate algorithm (e.g., based on least-recently-used page, FIFO, LIFO, best fit in RAM 304, etc.). At step 416, if it is determined that the data on the page to be replaced has been updated since it was paged in from the hard disk 302, the page is written to the hard disk 302 for later retrieval at step 418 and control is transferred to step 420. If the page to be replaced has not been updated or after it has been written to the hard disk 302, a physical page in the RAM 304 corresponding to the replaced page is made free at step 420.

At step 422, the MMU 306 maps the new virtual memory 308 page to the corresponding physical page in the RAM 304. At step 424, an ordered list of pages available in the RAM 304 and the hard disk 302 is updated. At step 426, the page on the hard disk 302, which represents the requested virtual memory 308 page from step 402 is stored into the newly available physical page in the RAM 304 made free at step 420 and control returns to step 410, completing the process.

The present invention stores information relating to various processes described herein. This information is stored in one or more memories, such as a hard disk, optical disk, magneto-optical disk, RAM, etc. One or more databases, such as the databases within the systems 106, 108, 118, 124, 126 and 122, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 5, for example.

The previously described processes include appropriate data structures for storing data collected and/or generated by the processes of the system 100 of FIG. 1 in one or more databases thereof. Such data structures accordingly will include fields for storing such collected and/or generated data. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

All or a portion of the invention (e.g., as described with respect to FIGS. 1-4) may be conveniently implemented using one or more conventional general purpose computers, microprocessors, digital signal processors, micro-controllers, etc., programmed according to the teachings of the present invention (e.g., using the computer system of FIG. 5), as will be appreciated by those skilled in the computer art. Appropriate software can be readily prepared by programmers of ordinary skill based on the teachings of the present disclosure, as will be appreciated by those skilled in the software art. In addition, the present invention (e.g., as described with respect to FIGS. 1-4) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 5).

Figure 5:
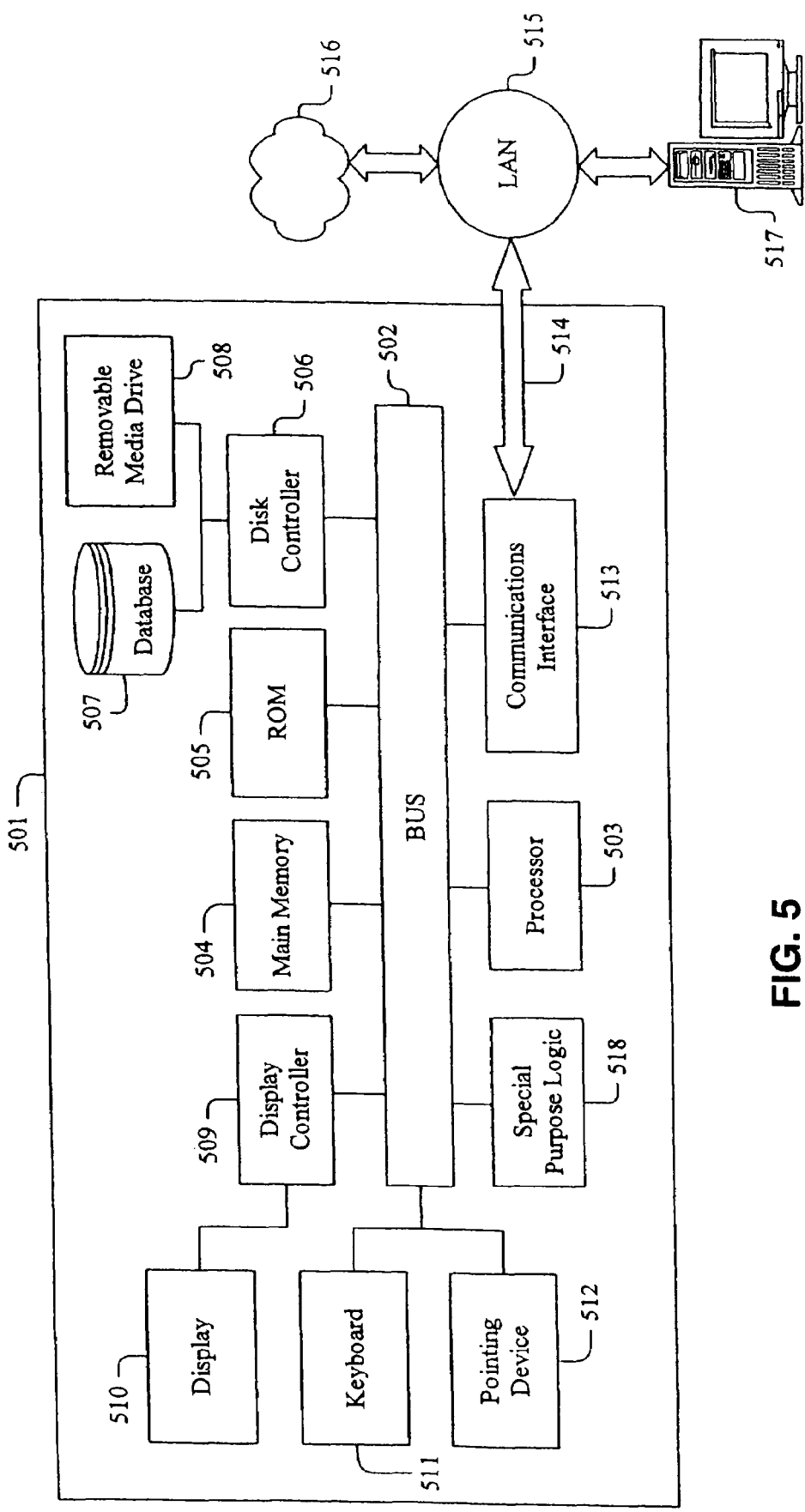
FIG. 5 is an exemplary computer system, which may be programmed to perform one or more of the processes of the present invention.

FIG. 5 illustrates a computer system 501 upon which the present invention (e.g., systems 106, 108, 118, 124, 126, 122, etc.) can be implemented. The present invention may be implemented on a single such computer system, or a collection of multiple such computer systems. The computer system 501 includes a bus 502 or other communication mechanism for communicating information, and a processor 503 coupled to the bus 502 for processing the information. The computer system 501 also includes a main memory 504, such as a random access memory (RAM), other dynamic storage device (e.g., dynamic RAM (DRAM), static RAM (SRAM), synchronous DRAM (SDRAM)), etc., coupled to the bus 502 for storing information and instructions to be executed by the processor 503. In addition, the main memory 504 can also be used for storing temporary variables or other intermediate information during the execution of instructions by the processor 503. The computer system 501 further includes a read only memory (ROM) 505 or other static storage device (e.g., programmable ROM (PROM), erasable PROM (EPROM), electrically erasable PROM (EEPROM), etc.) coupled to the bus 502 for storing static information and instructions.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices 518, such as application specific integrated circuits (ASICs), fall custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, satellite television receiver functions, set top box 124 functions, etc.

The computer system 501 may also include a display controller 509 coupled to the bus 502 to control a display 510, such as a cathode ray tube (CRT), liquid crystal display (LCD), active matrix display, plasma display, touch display, etc., for displaying or conveying information to a computer user. The computer system includes input devices, such as a keyboard 511 including alphanumeric and other keys and a pointing device 512, for interacting with a computer user and providing information to the processor 503. The pointing device 512, for example, may be a mouse, a trackball, a pointing stick, etc., or voice recognition processor, etc., for communicating direction information and command selections to the processor 503 and for controlling cursor movement on the display 510. In addition, a printer may provide printed listings of the data structures/information of the system shown in FIGS. 1-6, or any other data stored and/or generated by the computer system 501.

The computer system 501 performs a portion or all of the processing steps of the invention in response to the processor 503 executing one or more sequences of one or more instructions contained in a memory, such as the main memory 504. Such instructions may be read into the main memory 504 from another computer readable medium, such as a hard disk 507 or a removable media drive 508. Execution of the arrangement of instructions contained in the main memory 504 causes the processor 503 to perform the process steps described herein. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

Stored on any one or on a combination of computer readable media, the present invention includes software for controlling the computer system 501, for driving a device or devices for implementing the invention, and for enabling the computer system 501 to interact with a human user (e.g., a user of the systems 106, 108, 118, 124, 126, 122, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a digital subscriber line (DSL) card or modem, an integrated services digital network (ISDN) card, a cable modem, a telephone modem, etc., to provide a data communication connection to a corresponding type of telephone line. As another example, communication interface 513 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 513 sends and receives electrical, electromagnetic, or optical signals that carry digital data streams representing various types of information. Further, the communication interface 513 can include peripheral interface devices, such as a Universal Serial Bus (USB) interface, a PCMCIA (Personal Computer Memory Card International Association) interface, etc.

The network link 514 typically provides data communication through one or more networks to other data devices. For example, the network link 514 may provide a connection through local area network (LAN) 515 to a host computer 517, which has connectivity to a network 516 (e.g. a wide area network (WAN) or the global packet data communication network now commonly referred to as the "Internet") or to data equipment operated by service provider. The local network 515 and network 516 both use electrical, electromagnetic, or optical signals to convey information and instructions. The signals through the various networks and the signals on network link 514 and through communication interface 513, which communicate digital data with computer system 501, are exemplary forms of carrier waves bearing the information and instructions.

The computer system 501 can send messages and receive data, including program code, through the network(s), network link 514, and communication interface 513. In the Internet example, a server (not shown) might transmit requested code belonging an application program for implementing an embodiment of the present invention through the network 516, LAN 515 and communication interface 513. The processor 503 may execute the transmitted code while being received and/or store the code in storage devices 507 or 508, or other non-volatile storage for later execution. In this manner, computer system 501 may obtain application code in the form of a carrier wave. With the system of FIG. 5, the present invention may be implemented on the Internet as a Web Server 501 performing one or more of the processes according to the present invention for one or more computers coupled to the Web server 501 through the network 516 coupled to the network link 514.

The term "computer readable medium" as used herein refers to any medium that participates in providing instructions to the processor 503 for execution. Such a medium may take many forms, including but not limited to, non-volatile media, volatile media, transmission media, etc. Non-volatile media include, for example, optical or magnetic disks, magneto-optical disks, etc., such as the hard disk 507 or the removable media drive 508. Volatile media include dynamic memory, etc., such as the main memory 504. Transmission media include coaxial cables, copper wire, fiber optics, including the wires that make up the bus 502. Transmission media can also take the form of acoustic, optical, or electromagnetic waves, such as those generated during radio frequency (RF) and infrared (IR) data communications. As stated above, the computer system 501 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 515 and 516. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Although the present invention is described in terms of storage of program guide data 212*a* used in satellite communications systems, the present invention is applicable to other communications systems, such as cable communications systems, digital video broadcasting (DVB) communications systems, terrestrial broadcast communications systems, etc., that may transmit program guide data that uses large amounts of storage, as will be appreciated by those skilled in the relevant art(s).

Although the present invention is described in terms of storage of program guide data 212*a* for use by the program guide engine 204, the user interface 202, a television program guide, etc., applications, the present invention is applicable to storage of other data, such data structures, executable code, displayable user interface data, Web page data, etc., that may be used by other applications, such as database programs, executable programs, user interface programs, Web browser programs, etc., as will be appreciated by those skilled in the relevant art(s).

Although the present invention is described in terms of storage of program guide data 212*a* in the hard disk 302 and/or the RAM 304, the present invention is applicable to other bulk storage and physical medium, such as a floppy disk, a flexible disk, hard disk, magnetic tape, any other magnetic medium, a CD-ROM, CDRW, DVD, any other optical medium, any other physical medium with patterns of holes or other optically recognizable indicia, a PROM, and EPROM, a FLASH-EPROM, any other memory chip or cartridge, a carrier wave, other medium from which a computer can read, those listed with respect to FIG. 5, etc., as will be appreciated by those skilled in the relevant art(s).

While the present invention has been described in connection with a number of embodiments and implementations, the present invention is not so limited but rather covers various modifications and equivalent arrangements, which fall within the purview of the appended claims.

What is claimed is:

1. A system for efficient storage of data for use by an application, comprising:
    a set top box, including,
    a physical memory,
    a bulk storage device, and
    a memory management unit (MMU) provided as an interface between said application and said physical memory and said bulk storage device,
    wherein said physical memory and said bulk storage device are configured to store said data, and
    said MMU is configured to translate a virtual address provided by said application to a physical address used by one of said physical memory and said bulk storage device, and to page pages of said data stored in said physical memory to and from said bulk storage device.

2. The system of claim 1, wherein said MMU is configured to page said pages using an algorithm.

3. The system of claim 2, wherein said algorithm is based on a least-recently-used page basis.

4. The system of claim 2, wherein said algorithm is based on a First In First Out (FIFO) page basis.

5. The system of claim 2, wherein said algorithm is based on a Last In First Out (LIFO) page basis.

6. The system of claim 2, wherein said algorithm is based on a best fit in said physical memory basis.

7. The system of claim 1, wherein said data comprises program guide data for said application comprising a program guide for a plurality of program sources.

8. The system of claim 7, further comprising a communications channel configured to transmit said program guide data to said set top box.

9. The system of claim 8, wherein said communications channel is configured as one of a satellite communications channel, a cable communications channel, a digital video broadcasting (DVB) communications channel and a terrestrial broadcast communications channel.

10. The system of claim 7, wherein said program guide is configured to display said program guide data on a device coupled to said set top box in a tabular form including program times, program channels and program identifications.

11. The system of claim 10, wherein said program identifications include information regarding at least one of actors, ratings, description of programs, cost for pay per view, a frequency of said communications channel, a video channel within said frequency, and an audio channel within said frequency.

12. The system of claim 1, wherein said physical memory comprises a random access memory (RAM).

13. The system of claim 1, wherein said bulk storage device comprises a hard disk.

14. The system of claim 1, wherein said data comprises one of data structures, executable code, displayable user interface data, and Web page data for said application comprising a database application, an executable program application, a user interface program application, and a Web browser program application.

15. A method for efficient storage of data for use by an application, comprising:
    providing a memory management unit (MMU) as an interface between an application and a physical memory and a bulk storage device included in a set top box;
    configuring said physical memory and said bulk storage device to store said data; and
    configuring said MMU to translate a virtual address provided by said application to a physical address used by one of said physical memory and said bulk storage device, and to page pages of said data stored in said physical memory to and from said bulk storage device.

16. The method of claim 15, further comprising configuring said MMU to page said pages using an algorithm.

17. The method of claim 16, further comprising configuring said algorithm based on a least-recently-used page basis.

18. The method of claim 16, further comprising configuring said algorithm based on a First In First Out (FIFO) page basis.

19. The method of claim 16, further comprising configuring said algorithm based on a Last In First Out (LIFO) page basis.

20. The method of claim 16, further comprising configuring said algorithm based on a best fit in said physical memory basis.

21. The method of claim 15, wherein said data comprises program guide data for said application comprising a program guide for a plurality of program sources.

22. The method of claim 21, further comprising a communications channel configured to transmit said program guide data to said set top box.

23. The method of claim 22, wherein said communications channel is configured as one of a satellite communications channel, a cable communications channel, a digital video broadcasting (DVB) communications channel and a terrestrial broadcast communications channel.

24. The method of claim 21, wherein said program guide is configured to display said program guide data on a device coupled to said set top box in a tabular form including program times, program channels and program identifications.

25. The method of claim 24, wherein said program identifications include information regarding at least one of actors, ratings, description of programs, cost for pay per view, a frequency of said communications channel, a video channel within said frequency, and an audio channel within said frequency.

26. The method of claim 15, wherein said physical memory comprises a random access memory (RAM).

27. The method of claim 15, wherein said bulk storage device comprises a hard disk.

28. The method of claim 15, wherein said data comprises one of data structures, executable code, displayable user interface data, and Web page data for said application comprising a database application, an executable program application, a user interface program application, and a Web browser program application.

29. A computer-readable device carrying one or more sequences of one or more instructions for efficient storage of data for use by an application, the one or more sequences of one or more instructions including instructions which, when executed by one or more processors, cause the one or more processors to perform the steps recited in any one of claims 15-28.

30. A system for efficient storage of data for use by an application, comprising:
  a set top box means, including,
  physical memory means,
  bulk storage means, and
  memory management means provided as an interface between said application and said physical memory means and said bulk storage means,
  wherein said physical memory means and said bulk storage means store said data, and
  said memory management means translates a virtual address provided by said application to a physical address used by one of said physical memory means and said bulk storage means, and pages of said data stored in said physical memory to and from said bulk storage device.

* * * * *